United States Patent
Lee et al.

(10) Patent No.: US 7,812,072 B2
(45) Date of Patent: Oct. 12, 2010

(54) METHOD OF PREPARING STYRENE POLYMER-SILICA NANOCOMPOSITE

(75) Inventors: Byeong Do Lee, Yeosu-si (KR); Young Sub Jin, Seongnam-si (KR); Hwan Seok Park, Ansan-si (KR); Jae Keun Hong, Gunpo-si (KR); Young Sik Ryu, Annyang-si (KR); Il Jin Kim, Gunpo-si (KR)

(73) Assignee: Cheil Industries, Inc., Gumi-si (KR)

( * ) Notice: Subject to any disclaimer, the term of this patent is extended or adjusted under 35 U.S.C. 154(b) by 0 days.

(21) Appl. No.: 12/130,099

(22) Filed: May 30, 2008

(65) Prior Publication Data

US 2008/0255270 A1      Oct. 16, 2008

Related U.S. Application Data

(63) Continuation of application No. PCT/KR2005/004631, filed on Dec. 29, 2005.

(30) Foreign Application Priority Data

Dec. 23, 2005    (KR) .................. 10-2005-0128969

(51) Int. Cl.
*C09B 67/00* (2006.01)
*C08J 3/25* (2006.01)
*B60C 1/00* (2006.01)

(52) U.S. Cl. .............. 523/333; 523/205; 523/216; 524/450; 524/493; 524/534

(58) Field of Classification Search .......... 526/72, 526/89, 126; 523/105, 205, 216, 334, 333; 524/449, 450, 451, 534, 789, 791, 856, 493
See application file for complete search history.

(56) References Cited

U.S. PATENT DOCUMENTS

| | | | | |
|---|---|---|---|---|
| 4,810,734 A | * | 3/1989 | Kawasumi et al. | 523/216 |
| 4,889,885 A | * | 12/1989 | Usuki et al. | 524/445 |
| 5,322,889 A | * | 6/1994 | Yamamoto et al. | 524/789 |
| 5,733,644 A | * | 3/1998 | Tanaka et al. | 428/215 |
| 5,939,471 A | * | 8/1999 | Watanabe et al. | 523/334 |
| 6,610,780 B1 | | 8/2003 | Payzant et al. | |
| 6,627,314 B2 | * | 9/2003 | Matyjaszewski et al. | 428/403 |
| 6,737,486 B2 | * | 5/2004 | Wang | 526/144 |
| 2002/0107340 A1 | | 8/2002 | Matyjaszewski et al. | |
| 2003/0055148 A1 | | 3/2003 | Tang et al. | |
| 2005/0245665 A1 | * | 11/2005 | Chen | 524/493 |

FOREIGN PATENT DOCUMENTS

| | | |
|---|---|---|
| CN | 1530382 A1 | 9/2004 |
| JP | 2004-175915 A | 6/2004 |
| KR | 2004-74531 A | 8/2004 |
| KR | 2005-56812 A | 6/2005 |

OTHER PUBLICATIONS

Percy et al. "Surface characterization of vinyl polymer-silica colloidal nanocomposites using X ray photoelectron spectroscopy." Journal of Materials Chemistry. Jan. 29, 2002, pp. 697-702.*
International Search Report in corresponding International Application No. PCT/KR2005/004631, dated Sep. 14, 2006.
Chinese Office Action in counterpart Chinese Application No. 200580052340.8, dated Mar. 31, 2010.
English translation of Chinese Office Action in counterpart Chinese Application No. 200580052340.8, dated Mar. 31, 2010.

* cited by examiner

*Primary Examiner*—Vasu Jagannathan
*Assistant Examiner*—Hannah Pak
(74) *Attorney, Agent, or Firm*—Summa, Additon & Ashe, P.A.

(57) ABSTRACT

A method of preparing a styrene polymer-silica nanocomposite is disclosed. One embodiment of the method includes polymerizing about 100 parts by weight of a monomer mixture including about 50 to about 80% by weight of an aromatic monomer an about 20 to about 50% by weight of a vinyl cyanide monomer with about 0.5 to about 30 parts by weight of a colloidal silica dispersed in a first organic solvent.

25 Claims, 4 Drawing Sheets

METHOD OF PREPARING STYRENE POLYMER-SILICA NANOCOMPOSITE

CROSS-REFERENCE TO RELATED APPLICATIONS

This application is a continuation-in-part application under 35 U.S.C. §365 (c) claiming the benefit of the filing date of PCT Application No. PCT/KR2005/004631 designating the United States, filed Dec. 29, 2005. The PCT Application claims the benefit of the earlier filing date of Korean Patent Application No. 10-2005-0128969, filed Dec. 23, 2005. The contents of the Korean Patent Application No. 10-2005-0128969 and the International Application No. PCT/KR2005/004631 are incorporated herein by reference in their entirety.

BACKGROUND

1. Field

The present disclosure relates to a method of preparing a styrene polymer-silica nanocomposite. More particularly, the present disclosure relates to a method of preparing a styrene polymer-silica nanocomposite of which properties are improved by polymerizing a monomer mixture with a colloidal-silica dispersed in an organic solvent.

2. Description of the Related Technology

As high technology industries, such as electrical and electronic industry, automobile industry and aircraft industry, develop, new materials with various properties fit for needs of the industries have been in demand. Polymer nanocomposites have been developed in response to the needs.

A clay-polymer nanocomposite, among other nanocomposites, is already well known through many prior art patents and publications. The clay-polymer nanocomposite is a composite having clay plates with a thickness of about 1 nm and a length of several to tens of micrometers (μm) uniformly dispersed in a polymer medium. It is known that clay can improve the mechanical properties of a polymer resin, such as mechanical strength, dimensional stability, and heat resistance, even with addition of a small amount thereof.

SUMMARY

One aspect of the invention provides a method of preparing a styrene polymer-silica nanocomposite. Preferred embodiments may provide one or more of the following: excellent mechanical properties, excellent transparency, and excellent processability and moldability.

One embodiment provides a method of preparing a styrene polymer-silica nanocomposite, the method comprising: mixing a monomer mixture with a colloidal silica dispersed in a first organic solvent to form a first mixture, the monomer mixture comprising an aromatic vinyl monomer and a cyanide vinyl monomer; and subjecting the first mixture to polymerization.

The colloidal silica may be in an amount from about 0.5 to about 30 parts by weight per 100 parts by weight of the monomer mixture. The aromatic vinyl monomer may be in an amount from about 50 to about 80% by weight with reference to the total weight of the monomer mixture. The cyanide vinyl monomer may be in an amount from about 20 to about 50% by weight with reference to the total weight of the monomer mixture.

The colloidal silica may have an average particle size of not greater than about 100 nm. The content of $O_2$ in the silica may be from about 20 to about 40% by weight per 100% by weight of the silica.

The first organic solvent may comprise at least one selected from the group consisting of methanol, isopropyl alcohol, ethylene glycol, and methyl ethyl ketone. The aromatic vinyl monomer may be selected from the group consisting of styrene, a-methyl styrene, vinyl toluene, t-butyl styrene, chlorostyrene, and derivatives of the foregoing. The cyanide vinyl monomer may be selected from the group comprising acrylonitrile, methacrylonitrile, and ethacrylonitrile.

The polymerization may comprise solution polymerization or mass polymerization. The polymerization may be solution polymerization, and the method may further comprise adding a second organic solvent to the monomer mixture prior to subjecting the mixture to the polymerization. The second organic solvent may comprise at least one selected from the group consisting of aromatic hydrocarbons, halides, and ketones. The second organic solvent may be in an amount from about 10 to about 40 parts by weight per 100 parts by weight of the monomer mixture. Mixing the monomer mixture with the colloidal silica may comprise using ultrasound.

Another embodiment provides a styrene polymer-silica nanocomposite prepared according to the method described above.

Another embodiment provides a method of preparing a styrene polymer-silica nanocomposite, the method comprising: dispersing silica nanoparticles in a mixture comprising an aromatic vinyl monomer and a cyanide vinyl monomer; and subjecting the resulting mixture to polymerization.

The silica nanoparticles may be in a colloidal state in a solvent. The solvent may be an organic solvent. The polymerization may comprise solution polymerization or mass polymerization. The method may further comprise adding a second organic solvent to the mixture prior to subjecting the mixture to the polymerization.

A method of preparing styrene polymer-silica nanocomposite according to one embodiment comprises steps of dispersing about 0.5 to about 30 parts by weight of a colloidal silica dispersed in a first organic solvent in 100 parts by weight of a monomer mixture comprising about 50 to about 80% by weight of an aromatic vinyl monomer and about 20 to about 50% by weight of a cyanide vinyl monomer, and polymerizing the resulting mixture.

Silica particles in the colloidal silica may have an average particle size smaller than about 100 nm. The $O_2$ content in the silica may be about 20 to about 40 wt % per 100 wt % of the silica. The first organic solvent may be one selected from the group consisting of methanol, isopropyl alcohol, ethylene glycol and methyl ethyl ketone. The aromatic vinyl monomer may be selected from the group consisting of styrene, α-methyl styrene, vinyl toluene, t-butyl styrene, chloro styrene, and a derivative thereof. The cyanide vinyl monomer may be one selected from the group consisting of acrylonitrile, methacrylonitrile, and ethacrylonitrile.

In the step of polymerizing the mixture, solution polymerization may be used. The solution polymerization may include adding about 10 to about 40 parts by weight of a second organic solvent to 100 parts by weight of the monomer mixture. The second organic solvent may be selected from the group consisting of alcohol, petroleum ether, ethylbenzene, toluene, xylene, carbon tetrachloride, chloroform and methylethylketone.

Another embodiment provides a styrene polymer-silica nanocomposites prepared according to the method described above.

DETAILED DESCRIPTION

Figure 1:
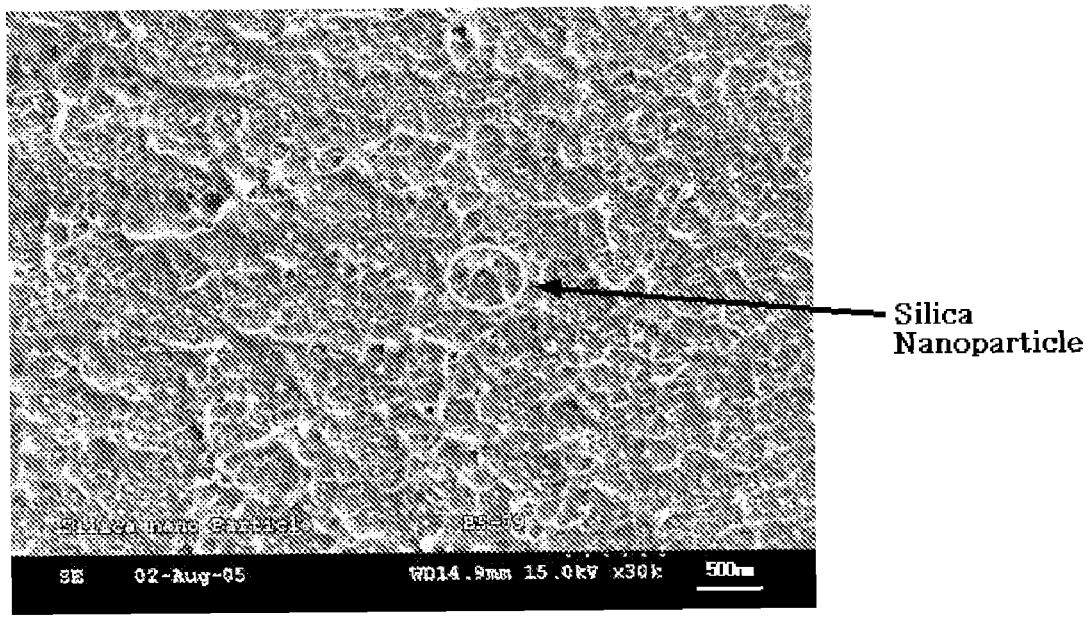
FIG. 1 is a micrograph, taken with a scanning electron microscope, of a styrene polymer-silica nanocomposite according to Example 1.

Styrene resins are widely used because they have excellent physical and chemical properties such as impact resistance, gloss, fluidity, transparency, and chemical resistance. For some articles that have a large-size and a thin profile, excellent impact resistance, fluidity, heat resistance and the like are required. In response to the needs, various researches on clay-polymer nanocomposites have been conducted. Some clay-polymer nanocomposites and methods for preparing them are disclosed in U.S. Pat. Nos. 4,810,734 and 4,889,885, and Korean Patent Application Publication Nos. 2004-74531 and 2005-56812.

However, the clay-polymer nanocomposites of the patents and patent applications have insufficient properties and disadvantages in that the clay particles may be re-crystallized during extrusion and injection molding; or the properties might not be as good as expected, since the polymer is merely infiltrated into a gap between organized clay layers or the distance between the layers becomes wider. In addition, the transparency of the resins might significantly deteriorate.

Accordingly, the present inventors has developed a method of making a new silica-dispersed styrene polymer nanocomposite, using a colloidal silica dispersed in an organic solvent, instead of clay. The silica-dispersed styrene polymer nanocomposite have enhanced mechanical properties.

A styrene polymer-silica nanocomposite according to one embodiment may be prepared by dispersing a colloidal silica in a monomer mixture, and then polymerizing the mixture. In one embodiment, the colloidal silica may be one dispersed in a first organic solvent. The colloidal silica may be in an amount of about 0.5 to about 30 parts by weight per 100 parts by weight of the monomer mixture. The monomer mixture may include about 50 to about 80% by weight of an aromatic vinyl monomer and about 20 to about 50% by weight of a cyanide vinyl monomer.

Examples of the aromatic vinyl monomer include, but are not limited to, styrene monomer such as styrene, a-methyl styrene, vinyl toluene, t-butyl styrene, chloro styrene and derivatives thereof. Examples of the cyanide vinyl monomer include, but are not limited to, acrylonitrile, methacrylonitrile, and ethacrylonitrile. They can be used alone or in combination with one another.

The colloidal silica may be silica nanoparticles dispersed in the first organic solvent. The silica nanoparticles according to one embodiment have an average particle size of not greater than about 1,000 nm, optionally not greater than about 100 nm. The average particle size of the silica nanoparticles may be about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 nm or a range of sizes that include two or more of any of the foregoing values. The content of $O_2$ in the silica may be about 20 wt % to about 40 wt % per 100 wt % of the silica. An exemplary colloidal silica is ORGANOSILICASOL™ available from Nissan Chemical Co. of Japan.

Examples of the first organic solvent include, but are not limited to, methanol, isopropyl alcohol, ethylene glycol, or methyl ethyl ketone. The first organic solvent is referred to as such to be distinguished from a second organic solvent used in solution polymerization which will be discussed below in detail.

With regard to the colloidal silica dispersed in the first organic solvent according to one embodiment, about 0.5 to about 30 parts by weight and optionally about 1 to about 20 parts by weight of the colloidal silica may be used per 100 parts by weight of the monomer mixture.

With respect to polymerization according to one embodiment, mass polymerization or solution polymerization may be used. In one embodiment, solution polymerization is used for polymerizing the mixture.

With respect to the second solvent used in the solution polymerization, any suitable organic solvent can be used if the organic solvent is substantially inert to any reaction while being capable of dissolving both monomers and the resulting polymer. Examples of the second organic solvent include, but are not limited to, aromatic hydrocarbons such as various alcohols, petroleum ether, ethyl benzene, toluene, and xylene; halides such as carbon tetrachloride and chloroform; or ketones such as methyl ethyl ketone. These can be used alone or in a mixture of two or more of the foregoing.

The amount of the second organic solvent may be determined, considering the viscosity of the resulting mixture so that the viscosity is suitable for a reactor. In one embodiment, the amount may be from about 10 to about 40 parts by weight per 100 parts by weight of the monomer mixture. The amount may be about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 parts by weight per 100 part by weight of the monomer mixture or a range of amounts that include two or more of any of the foregoing values. The polymerization according to one embodiment may be conducted at a temperature from about 90 to about 180° C., optionally from about 120 to about 160° C. The temperature may be about 90, 95, 100, 105, 110, 115, 120, 125, 130, 135, 140, 145, 150, 155, 160, 165, 170, 175, or 180° C. or a range of temperatures that include two or more of any of the foregoing values.

In one embodiment, an initiator may be used for the polymerization. Examples of the initiator include, but are not limited to, organic peroxides such as benzoylperoxide, cumene hydroperoxide, dicumylperoxide, and t-butylhydroperoxide; perester organic peroxides such as 1-1-di(t-butylperoxy)cyclohexane, 1,1-bis(t-butylperxoy)-3,3,5-trimethylcyclohexane, 1-1-bis(t-butylperxoy)cyclohexane; and azo organic compounds such as azobisisobuthyronitrile, 1-1 azobis (cyclohexane-1-carbonitrile), and 1-t-butylazo-1-cyanocyclohexane. These can be used alone or in a mixture of two or more of the foregoing. About 0.02 to about 1 parts by weight of the initiator may be used per 100 parts by weight of the monomer mixture. The amount of the initiator may be about 0.02, 0.03, 0.04, 0.05, 0.06, 0.07, 0.08, 0.09, 0.1, 0.2, 0.3, 0.4, 0.5, 0.6, 0.7, 0.8, 0.9, or 1.0 parts by weight per 100 parts by weight of the monomer mixture, or a range of amounts that include two or more of any of the foregoing values. It will be appreciated that the amount of the initiator may vary depending on the kind and temperature of polymerization.

The instant disclosure will be discussed in detail in the following examples, and the following examples are to illustrate, but not to limit the scope of the appended claims.

EXAMPLE 1

A complete-mixing type stirring reactor including two reactors connected in series (each having a capacity of 2,000 ml) was provided. A mixture of 5 parts by weight, on the basis of powder, of organic ORGANOSILICASOL™ (MEK-ST available from Nissan Chemical Co. of Japan) of which the average particle size was 10 to 15 nm, and 9 parts by weight of methyl ethyl ketone was mixed with 100 parts by weight of a monomer mixture of 75% by weight of styrene and 25% by weight of acrylonitrile in the reactor. Thereafter, the resulting mixture was subjected to ultrasonic waves for one hour. Then, 0.2 parts by weight of t-dodecyl mercaptan as a molecular weight controller and 0.1 parts by weight of 1-1 bis (t-butylperoxy) cyclohexane as an initiator were fed into a feed tank in which the mixture thereof was completely mixed and stirred. Thereafter, the resulting mixture was continuously supplied into the reactor at a feeding speed of 1.0 kg/hr. The polymerization temperature of the first reactor was 120° C. The polymerization temperature of the second reactor was 140° C. A polymerization product in liquid state was continuously produced up to 70% of polymerization conversion rate. The liquid product was then fed into a devolatizer at 240° C. and 30 Torr, thereby removing unreacted reactants and the organic solvent. Pellets of styrene polymer-silica nanocomposite were prepared through a gear pump. Thereafter, the properties of the pellets were measured according to the methods described below and the results are shown in Table 1. An electron microscopic view of Example 1 is shown in FIG. 1.

EXAMPLE 2

Figure 2:
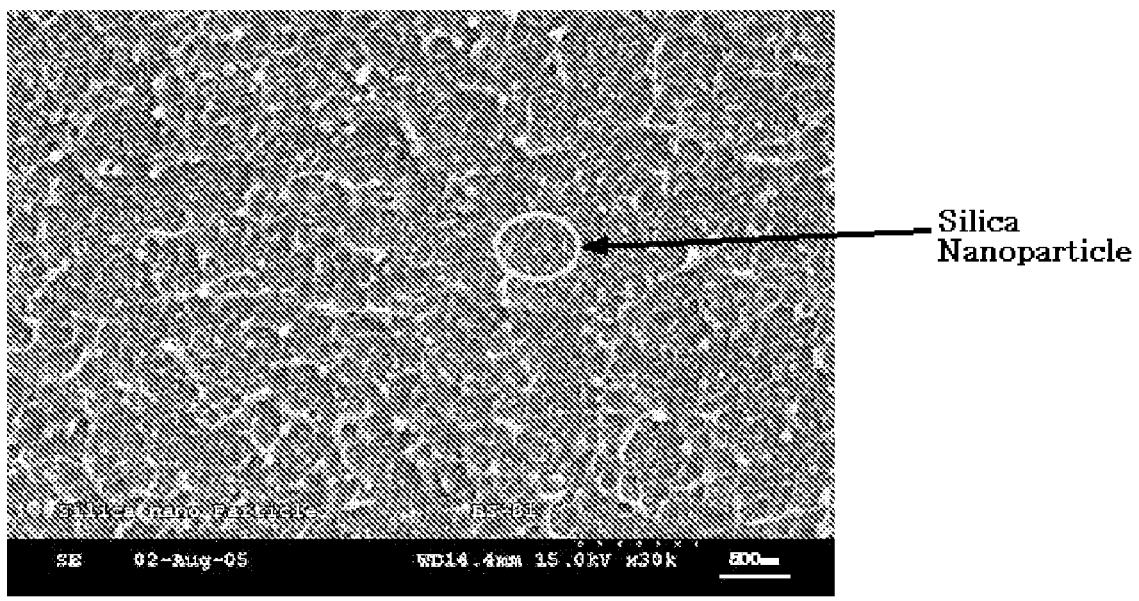
FIG. 2 is a micrograph, taken with a scanning electron microscope, of a styrene polymer-silica nanocomposite according to Example 2.

Pellets were produced in the same manner as in Example 1 except that the ORGANOSILICASOL™ (MEK-ST-MS available from Nissan Chemical Co. of Japan) in which the average diameter of silica nanoparticles is 17 to 23 nm was used. Then, the properties of the pellets were measured. The results are shown in Table 1. An electron microscopic view of Example 2 is shown in FIG. 2.

EXAMPLE 3

Figure 3:
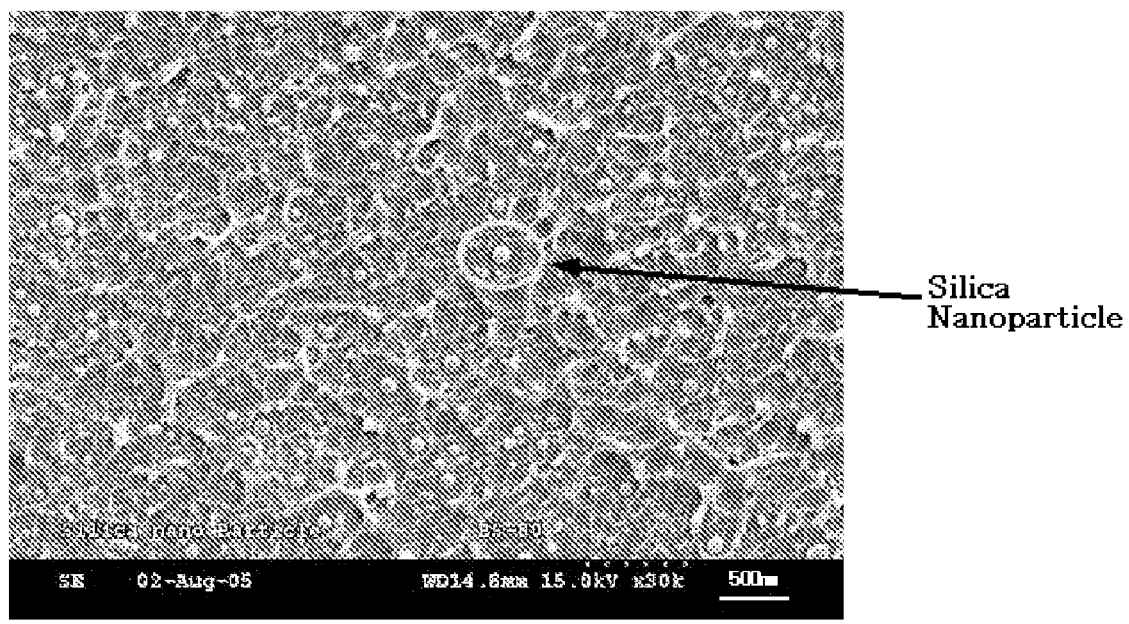
FIG. 3 is a micrograph, taken with a scanning electron microscope, of a styrene polymer-silica nanocomposite according to Example 3.

Pellets were produced in the same manner as in Example 1 except that the ORGANOSILICASOL™ (IPA-ST-ZL available from Nissan Chemical Co. of Japan) in which the average diameter of silica nanoparticles is 70 to 100 nm is used. Then, the properties of the pellets were measured. The results are shown in table 1. An electron microscopic view of Example 3 is shown in FIG. 3.

COMPARATIVE EXAMPLE 1

Figure 4:
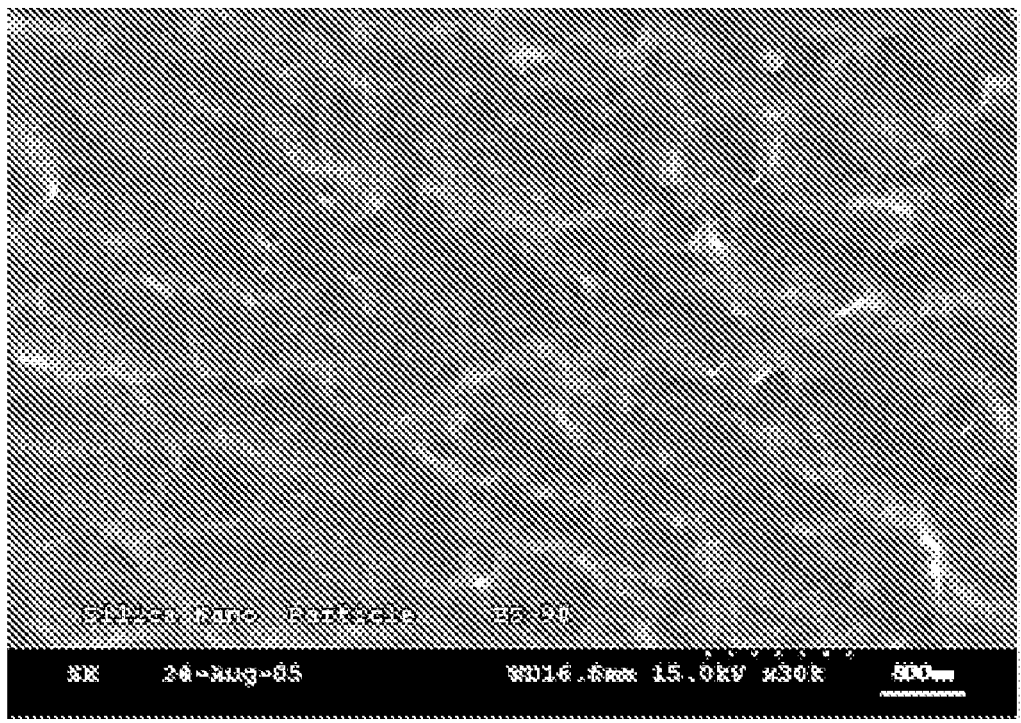
FIG. 4 is a micrograph, taken with a scanning electron microscope, of a styrene polymer according to Comparative Example 1.

Pellets were produced in the same manner as in Example 1 except that 15 parts by weight of a methyl ethyl ketone was used without ORGANOSILICASOL™. Then, the properties of the pellets were measured. The results are shown in the table 1. An electron microscopic view of Comparative Example 1 is shown in FIG. 4.

TABLE 1

|  | Examples | | | Comparative Example |
|---|---|---|---|---|
|  | 1 | 2 | 3 | 1 |
| Content of Inorganic Material (weight %) | 2.4 | 2.7 | 2.8 | 0 |
| Flexural Strength (Mpa) | 140 | 130 | 135 | 120 |
| Flexural Modulus (MPa) | 3,500 | 3,600 | 3,550 | 3,100 |
| Spiral Flow (cm) | 38.5 | 40.0 | 36.3 | 30.5 |
| Transmittance (%) | 79.2 | 78.5 | 65.4 | 80.6 |

Methods for measuring the properties of the pellets are as follows:
a. Content of inorganic material (weight %): 3.0 g of a specimen was placed in a melting pot and then was heated in an electric oven at 600° C. for 60 minutes. The content of inorganic material was measured using the resulting ash.
b. Flexural strength: Flexural strength was measured in accordance with ASTM D790.
c. Flexural modulus: Flexural modulus was measured in accordance with ASTM D790.
d. Spiral flow: The length of a resin which had been injected during injection through a spiral mold was measured. The length of the resin which had been changed during injection or pressurization through a gate in the middle was evaluated.
e. Transmittance: Transmittance was measured in accordance with ASTM D1003.

As shown in the table 1, the styrene polymer-silica nanocomposites in Examples 1 to 3 were better than the styrene polymer of Comparative Example 1 with respect to flexural strength and flexural modulus. In addition, their excellent spiral flow shows that the molding property has improved. Particularly, permeability was excellent in Examples 1 and 2 in which the average particle size of ORGANOSILICASOL™ was smaller than 50 nm.

In the foregoing discussions, that referred to as a comparative example does not necessarily represent prior art and the term "comparative example" does not constitute an admission of prior art.

Although certain embodiments of the invention have been disclosed for illustrative purposes, those skilled in the art will appreciate that various modifications, additions and substitutions are possible, without departing from the scope and spirit of the invention as disclosed in the accompanying claims.

What is claimed is:
1. A method of preparing an aromatic vinyl-cyanide vinyl copolymer-silica nanocomposite, the method comprising:
   mixing 100 parts by weight of a monomer mixture with about 0.5 to about 30 parts by weight of colloidal silica nanoparticles dispersed in a first organic solvent to form a first mixture, the monomer mixture comprising an aromatic vinyl monomer and a cyanide vinyl monomer; and
   subjecting the first mixture to polymerization to form said aromatic vinyl-cyanide vinyl copolymer-silica nanocomposite including a single aromatic vinyl-cyanide vinyl copolymer matrix formed of said monomer mixture comprising said aromatic vinyl monomer and said cyanide vinyl monomer and said colloidal silica nanoparticles distributed in the single aromatic vinyl-cyanide vinyl copolymer matrix.

2. The method of claim 1, wherein the aromatic vinyl monomer is in an amount from about 50 to about 80% by weight with reference to the total weight of the monomer mixture.

3. The method of claim 1, wherein the cyanide vinyl monomer is in an amount from about 20 to about 50% by weight with reference to the total weight of the monomer mixture.

4. The method of claim 1, wherein the colloidal silica nanoparticles have an average particle size of not greater than about 100 nm.

5. The method of claim 1, wherein the content of $O_2$ in the colloidal silica nanoparticles is from about 20 to about 40% by weight per 100% by weight of the colloidal silica nanoparticles.

6. The method of claim 1, wherein the first organic solvent comprises at least one selected from the group consisting of methanol, isopropyl alcohol, ethylene glycol, and methyl ethyl ketone.

7. The method of claim 1, wherein the aromatic vinyl monomer is selected from the group consisting of styrene, α-methyl styrene, vinyl toluene, t-butyl styrene, chlorostyrene, and derivatives of the foregoing.

8. The method of claim 1, wherein the cyanide vinyl monomer is selected from the group consisting of acrylonitrile, methacrylonitrile, and ethacrylonitrile.

9. The method of claim 1, wherein the polymerization comprises solution polymerization or mass polymerization.

10. The method of claim 9, wherein the polymerization is solution polymerization, and wherein the method further comprises adding a second organic solvent to the monomer mixture prior to subjecting the mixture to the polymerization.

11. The method of claim 10, wherein the second organic solvent comprises at least one selected from the group consisting of aromatic hydrocarbons, halides, and ketones.

12. The method of claim 10, wherein the second organic solvent is in an amount from about 10 to about 40 parts by weight per 100 parts by weight of the monomer mixture.

13. The method of claim 1, wherein mixing the monomer mixture with the colloidal silica comprises using ultrasound.

14. An aromatic vinyl-cyanide vinyl copolymer-silica nanocomposite prepared according to the method of claim 1.

15. A method of preparing an aromatic vinyl-cyanide vinyl copolymer-silica nanocomposite, the method comprising:
dispersing about 0.5 to about 30 parts by weight of silica nanoparticles in 100 parts by weight of a mixture comprising an aromatic vinyl monomer and a cyanide vinyl monomer; and
subjecting the resulting mixture to polymerization to form said aromatic vinyl-cyanide vinyl copolymer-silica nanocomposite including a single aromatic vinyl-cyanide vinyl copolymer matrix formed of said aromatic vinyl monomer and said cyanide vinyl monomer and said silica nanoparticles distributed in the single aromatic vinyl-cyanide vinyl copolymer matrix.

16. The method of claim 15, wherein the silica nanoparticles are in a colloidal state in a solvent.

17. The method of claim 16, wherein the solvent is an organic solvent.

18. The method of claim 15, wherein the polymerization comprises solution polymerization or mass polymerization.

19. The method of claim 17, further comprising adding a second organic solvent to the mixture prior to subjecting the mixture to the polymerization.

20. The method of claim 1, wherein the first mixture consists essentially of the monomer mixture and the colloidal silica nanoparticles.

21. The method of claim 1, wherein:
the colloidal silica nanoparticles are in an amount from about 0.5 to about 30 parts by weight per 100 parts by weight of the monomer mixture;
the aromatic vinyl monomer is in an amount from about 50 to about 80% by weight with reference to the total weight of the monomer mixture; and
the cyanide vinyl monomer is in an amount from about 20 to about 50% by weight with reference to the total weight of the monomer mixture.

22. The method of claim 15, wherein said dispersing step comprises dispersing silica nanoparticles in a mixture comprising an aromatic vinyl monomer and a cyanide vinyl monomer to form a reaction mixture consisting essentially of silica nanoparticles, aromatic vinyl monomer and cyanide vinyl monomer.

23. The method of claim 22, wherein said reaction mixture consists essentially of colloidal silica in an amount from about 0.5 to about 30 parts by weight per 100 parts by weight of the monomer mixture; about 50 to about 80% by weight of the aromatic vinyl monomer with reference to the total weight of the monomer mixture; and about 20 to about 50% by weight of the cyanide vinyl monomer with reference to the total weight of the monomer mixture.

24. The method of claim 1, wherein the colloidal silica nanoparticles are in an amount from 0.5 to about 20 parts by weight per 100 parts by weight of the monomer mixture.

25. The method of claim 1, wherein the colloidal silica nanoparticles are in an amount from 0.5 to about 5 parts by weight per 100 parts by weight of the monomer mixture.

* * * * *